United States Patent [19]
Stirland et al.

[11] 3,723,013
[45] Mar. 27, 1973

[54] ALIGNMENT SYSTEM

[75] Inventors: Meade A. Stirland, Los Alamos, N. Mex.; John A. Kalinowski, San Ramon, Calif.

[73] Assignee: The United States of America as represented by the United States Atomic Energy Commission

[22] Filed: Oct. 23, 1970

[21] Appl. No.: 83,567

[52] U.S. Cl..................................356/152, 250/204
[51] Int. Cl...............................................G01b 11/26
[58] Field of Search..............356/152, 141; 250/204

[56] References Cited

UNITED STATES PATENTS

| | | | |
|---|---|---|---|
| 3,551,057 | 12/1970 | Hamilton et al. | 356/152 |
| 3,316,800 | 5/1967 | Kibler | 356/152 |
| 3,423,593 | 1/1969 | Chinnock | 356/152 |
| 3,207,904 | 9/1965 | Heinz | 250/204 |
| 3,470,377 | 9/1969 | Le Febre et al. | 356/152 |
| 3,567,326 | 3/1971 | Smith-Vaniz | 356/152 |
| 3,494,699 | 2/1970 | Gloge | 356/152 |
| 3,603,688 | 9/1971 | Smith-Vaniz | 356/152 |

*Primary Examiner*—Benjamin A. Borchelt
*Assistant Examiner*—S. C. Buczinski
*Attorney*—Roland A. Anderson

[57] ABSTRACT

This alignment system utilizes intermediate photodetectors having central apertures and a terminal photodetector, each photodetector having four quadrants of active area, with their centers aligned on the axis of a laser beam, their output signals being utilized to indicate alignment, or the degree of mis-alignment, of their centers with respect to the axis of the laser beam. Alternatively their output signals are utilized to drive servo systems that automatically move the quipments on which they are mounted into alignment, Means for providing orthogonal alignment, and means to avoid air turbulence are also provided.

8 Claims, 11 Drawing Figures

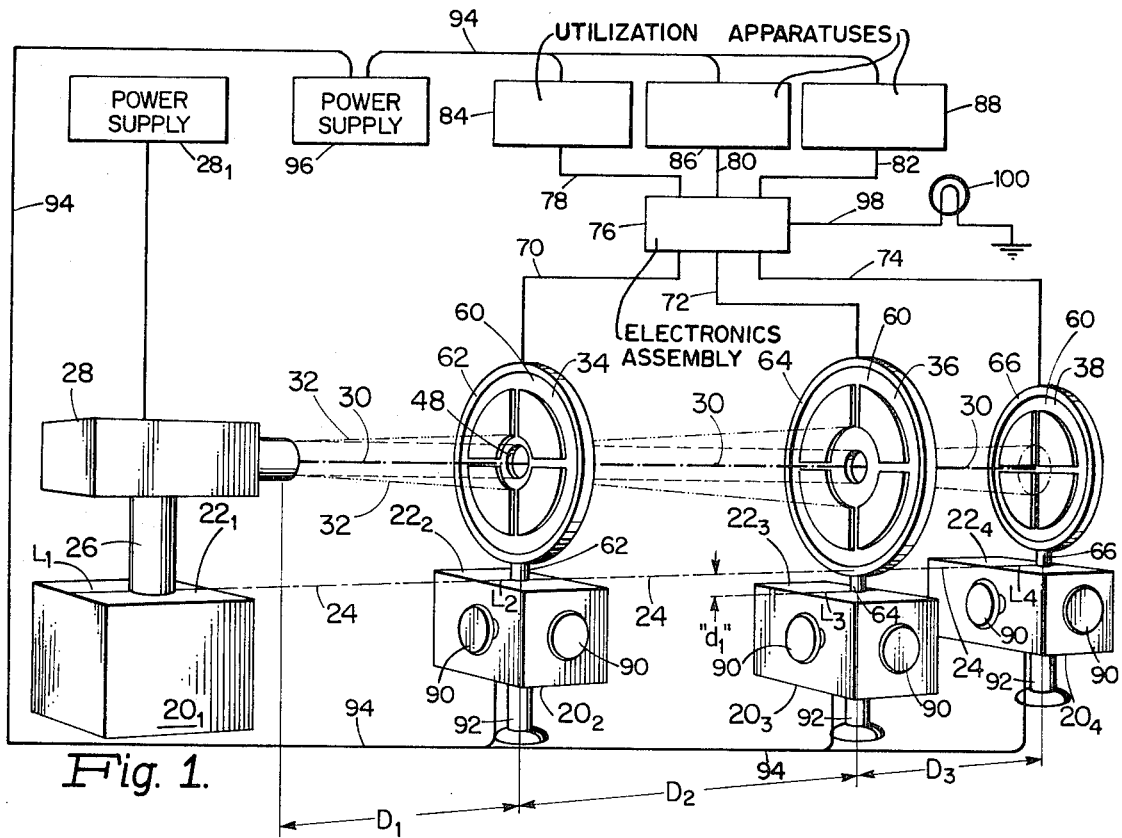
Fig. 1.
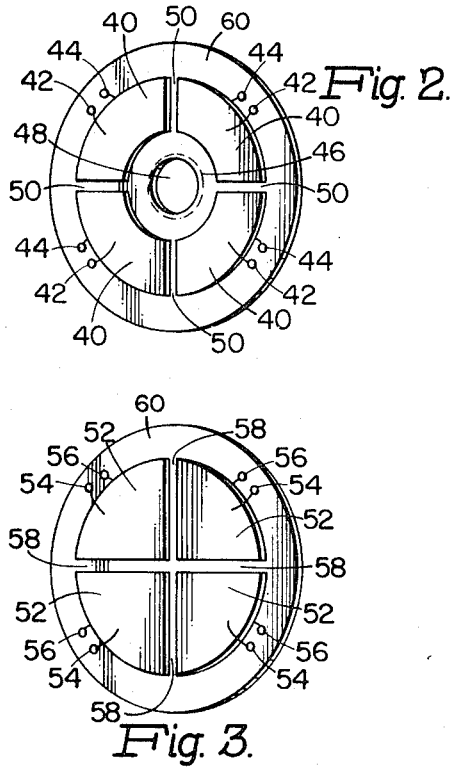
Fig. 2.
Fig. 3.
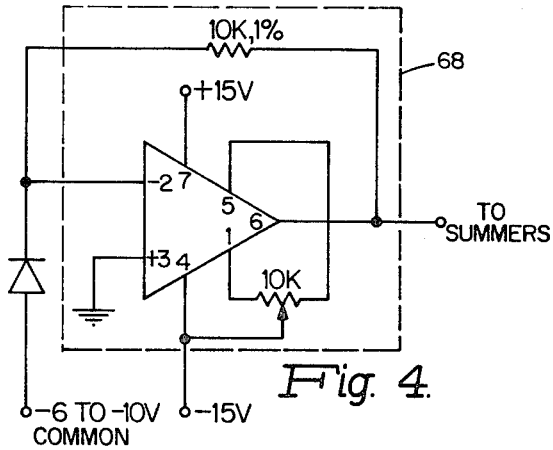
Fig. 4.
INVENTORS
MEADE A. STIRLAND
JOHN A. KALINOWSKI

INVENTORS
MEADE A. STIRLAND
JOHN A. KALINOWSKI
ATTORNEYS

PATENTED MAR 27 1973 3,723,013

INVENTORS
MEADE A. STIRLAND
JOHN A. KALINOWSKI
BY Ralph L. Cadwallader
Lawrence S. Perkins
ATTORNEYS

ALIGNMENT SYSTEM

This invention relates to a system for spatially adjusting points or objects until they are in alignment with reference to a straight line.

We made the present invention in the course of work under Contract No. AT(29-1)-1183 with the U.S. Atomic Energy Commission.

The present invention provides a novel and improved system by which desired conditions of relative alignment between selected objects may be quickly, efficiently and accurately attained.

The invention provides a system that automatically determines conditions of misalignment of objects relative to a sight line produced by the system and indicates requirements for achieving alignment.

The invention also provides a novel system for producing orthogonal alignment of a target relative to a sight line produced by the system.

Still further, the invention provides systems of the above character which are unique as to their simplicity, economy of construction and precision of operation.

Although the present alignment system has general application, it has its greatest advantage in connection with the use of remote control devices where human operators cannot be stationed at the points to be aligned because of inaccessibility, radiation hazard or some other prohibitive condition. Remote indicating means capable of high precision and appropriate correcting means operable by remote control then become necessary.

Thus, the invention provides an improved alignment system for indicating the departure of predetermined points from reference positions, provides remote control means for correcting indicated departures, provides an improved system for indicating misalignment and the effects of corrective efforts, and provides an improved target for such a system.

The foregoing and other advantages will become apparent and the invention will be better understood upon perusal of the following description of preferred embodiments as illustrated in the accompanying drawings. Various changes may be made, however, in the details and arrangement of parts and certain features may be employed without others. All such modifications within the scope of the appended claims comprise the invention.

In the drawings:

FIG. 1 is a partial block diagram and partial perspective view illustrating schematically the system of the present invention;

FIG. 2 illustrates

Figure 6:
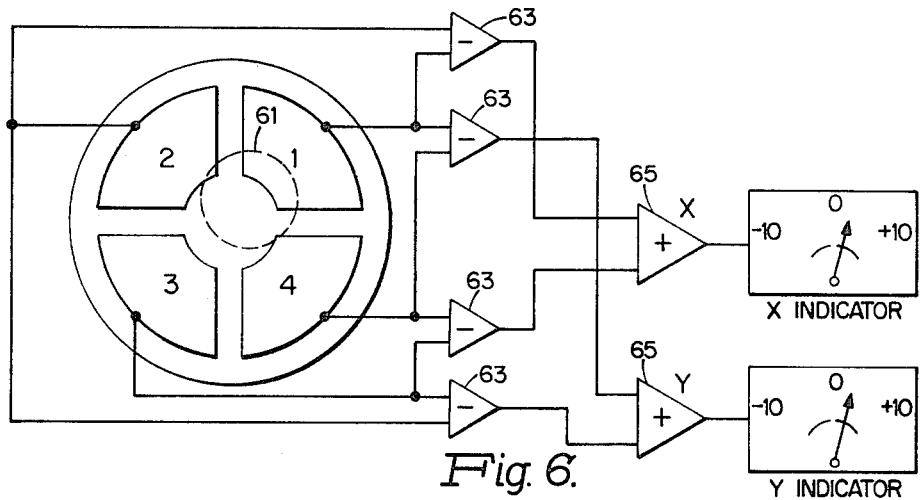
Figure 5:
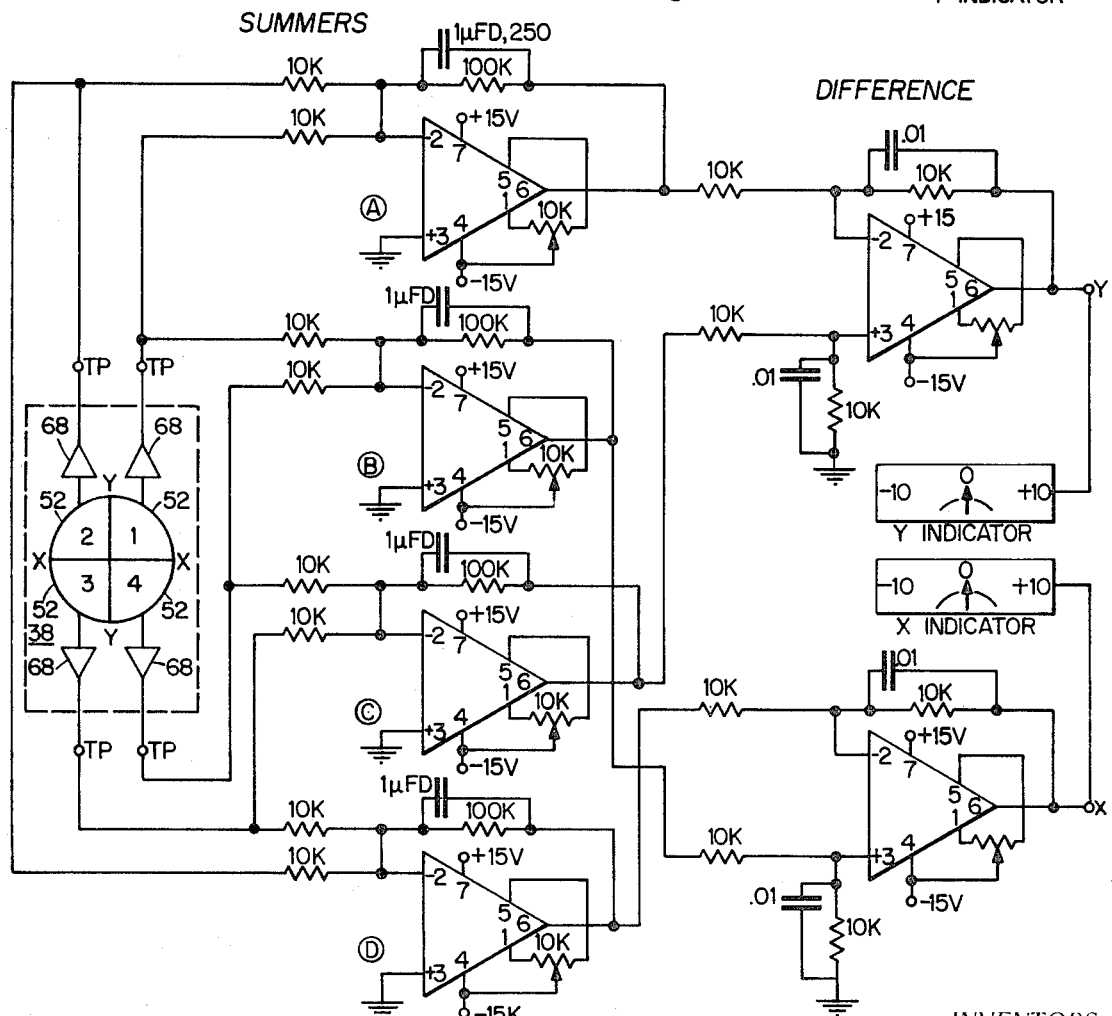
Figure 10:
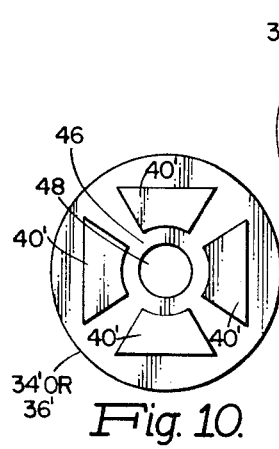
Figure 11:
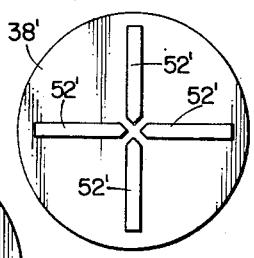
Figure 9:
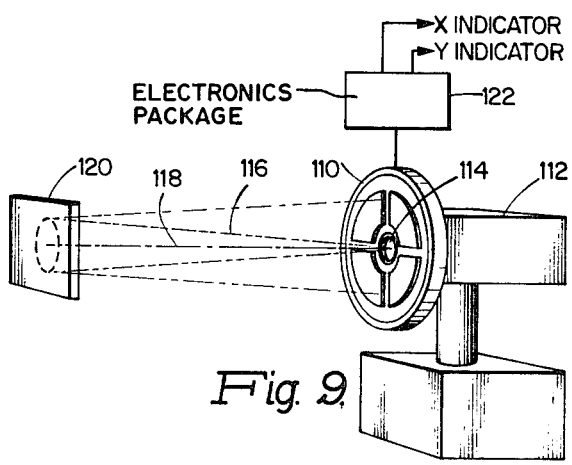
Figure 7:
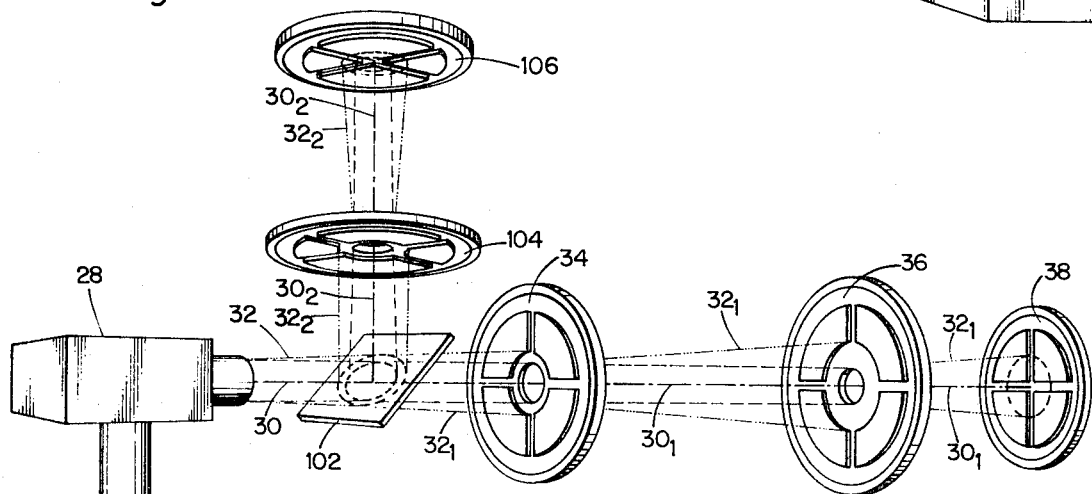
Figure 8:
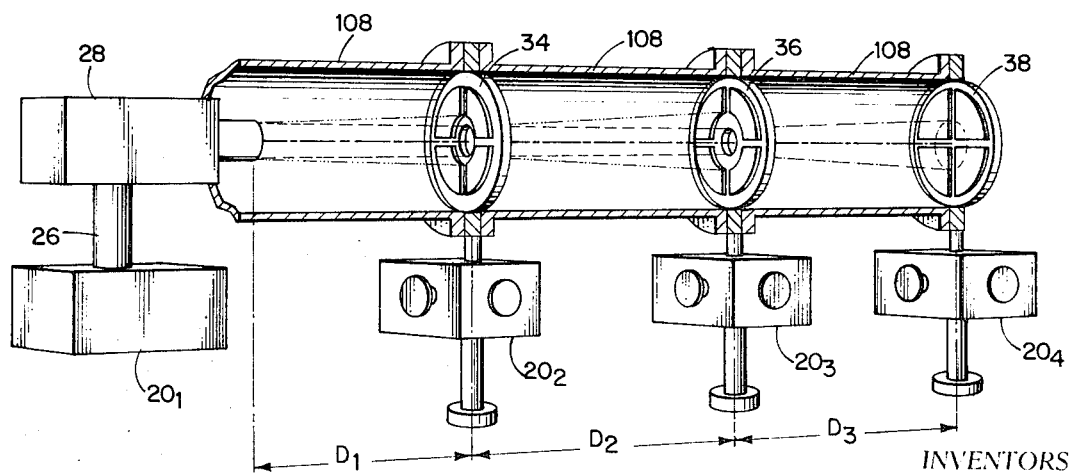

FIG. intermediate photodetector utilized in the system of the present invention;

FIG. 3 illustrates a terminal photodetector utilized in the system of the present invention;

FIG. 4 is a schematic diagram of an amplifier circuit that may be used with the photodetectors of FIGS. 2 and 3;

FIG. 5 illustrates schematically in detail one system for determining the orientation of the center of a photodetector with respect to a laser beam;

FIG. 6 illustrates schematically another system for determining the orientation of the center of a photodetector with respect to a laser beam;

FIG. 7 is an alternative embodiment of the system of FIG. 1 adapted to produce orthogonal alignment of a target;

FIG. 8 illustrates, in part, the system of FIG. 1 with a further modification;

FIG. 9 illustrates schematically the use of the invention in a collimation system; and FIGS. 10 and 11 illustrate variations in the shapes of the areas of the photodetectors of FIGS. 2 and 3.

FIG. 1 illustrates the system of the present invention as being utilized to align lines $L_1$, $L_2$ and $L_4$ on top surfaces $22_1$, $22_2$ and $22_4$, respectively, of equipments $20_1$, $20_2$ and $20_4$ along straight line 24, with $L_3$ of the top surface $22_3$ of equipment $20_3$ offset a predetermined distance $d_1$ from line 24. Note that the distances $D_1$, $D_2$, $D_3$, etc., between equipments $20_1$, $20_2$, etc. may vary. In one application of the invention $D_1$ was 33 feet, $D_2$ was 31 feet and $D_3$ was 36 feet for a total distance of 100 feet between equipment $20_1$ and equipment $20_4$.

Laser 28 mounts on equipment $20_1$, by suitable mounting means 26, with axis 30 of its beam 32 directed parallel to line 24. Supply $28_1$ powers laser 28. Intermediate photodetectors 34 and 36 protrude above equipments $20_2$ and $20_3$. Terminal photodetector 38 likewise protrudes above equipment $20_4$.

Referring, for the moment, to FIG. 2, intermediate photodetectors 34 and 36 have four quadrants 40, each shaped as a sector of an annulus, of photosensitive material. For example, quadrants 40 may be silicon photodiodes, each having terminals 42 and 44. Annulus 46 centers within quadrants 40. An inactive mask material coats annulus 46. Aperture 48 centers within annulus 46. The horizontal and vertical spacings 50 between quadrants 40 are about 0.010 inch. All quadrants 40 should be equal in area.

Terminal photodetector 38, illustrated in FIG. 3, similarly has four quadrants 52, shaped as 90° circular sectors, of photosensitive material. Quadrants 52 similarly may be silicon photodiodes having terminals 54 and 56. Terminal photodetector 38 has no center annulus of inactive masking material and no central aperture. Again, the horizontal and vertical spacings 58 between quadrants are about 0.010 inch.

FIGS. 1, 2 and 3 also show quadrants 52 affixed to suitable substrates 60, such as phenolic composition boards. This facilitates the mounting of photodetectors 34, 36 and 38 on mounting means 62, 64 and 66, respectively.

The dimensions of photodetector 34 and mounting means 62 are so selected, that when mounted on surface $22_2$, the center of aperture 48 of photodetector 34 lies on axis 30 of laser beam 32 when line $L_2$ of surface $22_2$ is aligned with line 24. Moreover, when lines $L_1$, $L_2$, $L_3$ and $L_4$ are properly aligned, surfaces $22_1$, $22_2$, $22_3$ and $22_4$ are parellel if mounting means 26, 62 64 and 66 are mounted perpendicular to said surfaces.

Since the divergence of laser beam 32 and distance $D_1$ are known, the diameter of laser beam 32 where it impinges on photodetector 34 either is known or can be calculated. The outer diameter of annulus 46 of inactive masking material is made equal to this diameter of the laser beam. The diameter of aperture 48 may, for example, be made equal to the diameter of the one-half power points of laser beam 32. The diameter of aperture 48 should not be so small as to cause diffraction rings to infringe on photodetector 36. In one system the diameter was 0.250 inch, the outer diameter of annulus 46 was 0.5 inch, the outer diameter of quadrants 40 was 1.12 inch, and substrate 60 had a diameter of 1.521 inch.

Laser beam 32 exits photodetector 34 with a diameter equal to the diameter of aperture 48 of photodetector 34. Again, since the divergence of laser beam 32 and distance $D_2$ are known, the diameter of laser beam 32 where it impinges on photodetector 36 either is known or can be calculated. Similarly, the outer diameter of annulus 46 of inactive mask material of photodetector 36 is made equal to this latter diameter of laser beam 32. The diameter of aperture 48 of photodetector 36 may likewise be made equal to the diameter of aperture 48 of photodetector 34. This is the diameter of laser beam 32 as it exits photodetector 36. It then impinges on terminal photodetector 38, a distance $D_3$ away. Again, the diameter of aperture 48 of photodetector 36 should not be so small as to cause diffraction rings to impinge on terminal photodetector 38.

The quadrant method of monitoring laser beam 32 at photodetectors 34, 36 and 38 requires that laser beam 32 meet certain requirements. Laser beam must have a very smooth continuous Gaussian distribution across the beam in all directions with a spherical distribution of the power throughout the wavefront. It must have a good spherical geometry and no hot spots across the beam front. Apertures 48 of intermediate photodetectors 34 and 36 must cause the first few heavy diffraction rings that carry most of the diffracted power to diverge less than the transmitted beam and the pattern at the periphery of the transmitted beam must have a Gaussian distribution. This is important since it is the periphery of the beam that falls on intermediate photodetectors 34 and 36 at the aligned position and hence it must be of uniform radial distribution. Any continuous wave or pulsed laser operating in the $TEM_{oo}$ mode generally meets these requirements.

A laser 28 having the above characteristics is the University Laboratories Model No. 240, a 1-milliwatt He-Ne laser (6328 A) operating in the $TEM_{oo}$ mode with a full-angle beam divergence of 0.8 milliradians and a beam width, at aperture, of 1.4 mm at the $1/e^2$ points.

With this laser and $D_1$ equal to 33 feet, and with aperture 48 of photodetector 34 equal to 0.250 inch and aligned with the axis of laser beam 32, aperture 48 transmits better than 80 percent of the power in laser beam 32 and the diffraction rings imposed on the beam by aperture 48 do not diverge outside the transmitted beam. With aperture 48 of photodetector 36 likewise equal to 0.250 inch and aligned with the axis of laser beam 32 of distance $D_2$ of 31 feet from photodetector 34, this latter aperture still transmits better than 75 percent of the initial power onto terminal photodetector 38 located a further distance $D_3$ away of 36 feet.

Referring to FIG. 1 it is now appropriate to summarize briefly. Assume first that photodetectors 34, 36 and 38 are aligned with the axis of laser beam 32. Laser beam 32 exits laser 28 and diverges to a diameter equal to the outer diameter of inactive mask material 46 of photodetector 34 as it impinges thereon. The amount of light in the outermost periphery of beam 32 impinging on the active areas of quadrants 40 is detected in quadrants 40, and, as will be hereinafter described, is summed in an appropriate manner and indicated on a readout system. After laser beam 32 exits aperture 48 of photodetector 34, it again diverges until its diameter equals the outer diameter of inactive mask material 46 of photodetector 36 as it impinges thereon. Again, the amount of light in the outermost periphery of beam 32 impinging on quadrants 40 of photodetector 36 is detected in quadrants 40, and is summed and indicated in a readout device. After laser beam 32 exits aperture 48 of photodetector 34, it again diverges and impinges on quadrants 52 of terminal photodetector 38, where it is detected and then summed and indicated in a readout device.

Where quadrants 40 and 52 are silicon photodiodes, each quadrant may require its own amplifier circuit 68 (such as the circuit illustrated, merely as an example, in FIG. 4) to amplify the signals produced in it up to a level suitable for operation of the electronic summing and difference network utilized. On the other hand, amplifier 68 of FIG. 4 may not be needed if signal conditions are otherwise suitable.

The circuit illustrated in FIG. 5 illustrates, by way of example, an electronic network of summing and difference circuits connected to terminal photodetector 38. Intermediate photodetectors 34 and 36 connect to this or similar networks. Note that the individual summing and difference circuits are conventional; hence their detailed operation will not be described. It will be seen that summing circuit A sums the signals from quadrants 1 and 2; B from quadrants 1 and 4; C from quadrants 3 and 4; and D from quadrants 2 and 3. The Y output represents the difference between the outputs of summing circuits A and C, or $[1+2]-[3+4]$ where these numerals represent the signals from the respective numbered quadrants. Similarly the X output represents the difference between the outputs of summing circuits B and D, or $[1+4]-[2+3]$ where the numerals represent the signals from the numbered quadrants. The outputs at X and Y connect to X and Y indicators, as illustrated, or to other utilization apparatus as will hereinafter be described.

Obviously the converse system of FIG. 6 may be used. Here dotted circle 61 represents the area of impingement of laser beam 32 on an intermediate photodetector. The signal outputs of quadrants 1 through 4 are applied to a system of four difference circuits 63, the outputs of which are applied to summing circuits 65 to drive X and Y indicators.

Referring again to FIG. 1, the outputs of photodetectors 34, 36 and 38 connect through cables 70, 72 and 74, respectively, to electronics assembly 76. Electronics assembly 76 contains the sum and difference networks needed to ascertain electronically the degree of misalignment of photodetectors 34, 36 and 38 with respect to axis 30 of laser beam 32. Cables 78, 80 and 82 connect electronic assembly 76 to utilization apparatuses 84, 86 and 88 respectively.

Utilization apparatuses 84, 86 and 88 may, for example, each contain X and Y indicators only. These indicate visually the X and Y directions of mis-alignment, or the alignment, of photodetectors 34, 36 and 38 with respect to axis 30 of laser beam 32. This embodiment finds particular utility in the situation, for example, where equipments $20_2$, $20_3$ and $20_4$ are readily accessible and can be manually adjusted in the X and Y directions by means of adjusting knobs 90 connected to suitable mechanical linkages for moving equipments $20_2$, $20_3$ and $20_4$ vertically with respect to standards 92 and orthogonally.

In those situations where equipments $20_2$, $20_3$ and $20_4$ are inaccessible, the invention provides automatic means for adjusting their orientations to maintain at zero the X and Y outputs of their respective sum and difference networks in electronic assembly 76. Such automatic means may, for example, comprise a servo system, in which utilization apparatuses 84, 86 and 88 are servo drivers connected by cabling 94 to servomechanisms (not shown) contained in equipments $20_2$, $20_3$ and $20_4$ for adjusting their X and Y orientations and to power supply 96 which provides power for the servo system.

We conducted a number of tests on photodetectors 34, 36 and 38 of FIG. 1 where $D_1$ was 33 feet, $D_2$ was 31 feet and $D_3$ was 36 feet, and quadrants 40 and 52 of the photodetectors were silicon photodiodes.

Quadrants 40 of intermediate photodetectors 34 and 36 had an outer diameter of 1.12 inch and an inner diameter of 0.50 inch, with 0.010 inch spacings between quadrants. Quadrants 52 of terminal photodetector 38 had an outer diameter of 1.12 inch with 0.010 inch spacings between quadrants.

In the first test we measured the dark current of each quadrant by connecting it to a power supply to provide bias and to a Keithly 417 picoammeter. A dark box with electrical feedthroughs held the photodetectors and provided light isolation. The temperature was 23.5°C ± 1°. Each diode was reverse-biased at 10 volts. The resulting data, shown in Table 1, indicate good matching between quadrants of individual photodetectors, and very similar matching between photodetectors.

TABLE 1

Dark current of photodetectors. Data taken at 23.5° C ± 1° C. Diodes reverse biased at 10 V.

| Intermediate Photodetector 34 | Dark Current |
|---|---|
| Quadrant No. 1 | $1.4 \times 10^{-6}$ A |
| 2 | $1.36 \times 10^{-6}$ A |
| 3 | $1.47 \times 10^{-6}$ A |
| 4 | $1.57 \times 10^{-6}$ A |
| Intermediate Photodetector 36 | |
| Quadrant No. 1 | $1.35 \times 10^{-6}$ A |
| 2 | $1.50 \times 10^{-6}$ A |
| 3 | $1.57 \times 10^{-6}$ A |
| 4 | $1.60 \times 10^{-6}$ A |
| Terminal Photodetector 38 | |
| Quadrant No. 1 | $8.5 \times 10^{-7}$ A |
| 2 | $8.5 \times 10^{-7}$ A |
| 3 | $9.0 \times 10^{-7}$ A |
| 4 | $9.5 \times 10^{-7}$ A |

After assemblying the system of FIG. 1 we determined the individual response of photodetectors 34, 36 and 38 to offsets to each of 0.01 inch in each of the four cardinal directions, ±X and ± Y. This was done at each photodetector with readings at the X-Indicator of the circuit of FIG. 5 for that photodetector for offsets in the X direction and readings at the Y-Indicator for offsets in the Y direction. The data, shown in Table 2, indicate a very good balance of photodetector output in response to extent of offset of the photodetector from laser beam 32. The value of the response of terminal photodetector 38 is noticeably higher than the responses of intermediate photodetectors 34 and 36. This results because quadrants 52 of photodetector 38 have much more area than quadrants 40 of photodetectors 34 and 36. Consequently, quadrants 52 intercept much more light.

TABLE 2

Response of photodetectors 34, 36 and 38 to 0.010 - inch offsets.

| Intermediate Photodetector 34 Direction | Reading |
|---|---|
| +x | −3.25 V |
| −x | +3.25 V |
| +y | −3.25 V |
| −y | +3.25 V |
| Intermediate Photodetector 36 | |
| +x | −4 V |
| −x | +4 V |
| +y | −4 V |
| −y | +4 V |
| Terminal Photodetector 38 | |
| +x | −8.5 V |
| −x | +8.5 V |
| +y | −8.5 V |
| −y | +8.5 V |

Next, we entered offsets to intermediate photodetector 34 and measured the responses of the three photodetectors 34, 36 and 38. Then, we entered offsets to intermediate photodetector 36 and measured the responses of photodetectors 36 and 38. Last, we entered offsets to terminal photodetector 38 and measured its responses. The data are presented in Table 3.

Note than when photodetector 34 was offset in a positive X- direction, the response for photodetector 34 was a negative voltage, the response for photodetector 36 was a positive voltage and the response for terminal photodetector 38 began as a negative voltage for the first few thousandths of an inch of offset and then changed to a positive voltage. Consider what happens. When intermediate photodetector 34 is offset in positive X-direction, it intercepts more of the negative side of laser beam 32 which impinges on quadrants 3 and 4, producing negative voltages. Power is extracted from that portion of beam 32. As the transmitted beam proceeds to intermediate photodetector 36, the beam is weak on that side and the response of photodetector 36 indicates the decrease of power in that portion of the beam by producing positive voltages. However, when the beam impinges on terminal photodetector 38 its geometry has been changed by beam divergence, diffraction and other factors to where the majority of the power is again in the negative side of the beam for the first few thousandths of an inch of offset. To generalize, when an offset is positive (negative), the response of photodetector 34 is negative (positive) and the responses of photodetectors 36 and 38 are positive (negative).

TABLE 3

Response of photodetectors 34, 36 and 38 to offsets along major axes

Intermediate Photodetector 34

Offset in -x direction, x-reading photodetectors 34, 36 and 38

| Offset | Photodetector 34 | Photodetector 36 | Photodetector 38 |
|---|---|---|---|
| 0.025 in. | +0.50 V | −1.00 V | +1.00 V |

| | | | |
|---|---|---|---|
| 0.050 in. | +1.00 V | −2.25 V | −1.50 V |
| 0.075 in. | +2.25 V | −3.00 V | −4.50 V |
| 0.100 in. | +4.00 V | −4.00 V | −5.00 V |
| 0.125 in. | +7.00 V | −3.75 V | −3.25 V |
| 0.150 in. | +10.00 V | −3.75 V | −1.25 V |

Offset in +x direction, x-reading photodetectors 34, 36 and 38

| Offset | Photodetector 34 | Photodetector 36 | Photodetector 38 |
|---|---|---|---|
| 0.025 in | −0.50 V | +1.25 V | −1.50 V |
| 0.050 in. | −1.00 V | +2.50 V | 0 |
| 0.750 in. | −1.50 V | +3.75 V | +2.75 V |
| 0.100 in. | −3.25 V | +4.25 V | +5.50 V |
| 0.125 in. | −5.50 V | +4.50 V | +3.75 V |
| 0.150 in. | −8.50 V | +4.50 V | +1.50 V |
| 0.175 in. | −11 (off scale) | +4.00 V | +0.50 V |

Offset in +y direction, y-reading photodetectors 34, 36 and 38

| Offset | Photodetector 34 | Photodetector 36 | Photodetector 38 |
|---|---|---|---|
| 0.025 in. | −.50 V | +1.25 V | −1.50 V |
| 0.050 in. | −1.00 V | +2.50 V | 0 |
| 0.075 in. | −1.50 V | +3.75 V | +3.75 V |
| 0.100 in. | −3.00 V | +4.50 V | +5.00 V |
| 0.125 in. | −4.75 V | +4.75 V | +3.50 V |
| 0.150 in, | −7.50 V | +4.50 V | +1.25 V |
| 0.175 in. | −11 (off scale) | +4.50 V | +0.25 V |

Offset in −y direction, y-reading photodetectors 34, 36 and 38

| Offset | Photodetector 34 | Photodetector 36 | Photodetector 38 |
|---|---|---|---|
| 0.025 in. | +0.50 V | −1.00 V | +0.75 V |
| 0.050 in. | +1.00 V | −2.00 V | −1.00 V |
| 0.075 in. | +2.00 V | −3.00 V | −4.50 V |
| 0.100 in. | +3.50 V | −3.50 V | −5.00 V |
| 0.125 in. | +7.50 V | −3.50 V | −3.25 V |
| 0.150 in. | +10.00 V | −3.75 V | −1.25 V |

Intermediate Photodetector 36

Offset in −x direction, x-reading photodetectors 36 and 38

| Offset | Photodetector 36 | Photodetector 38 |
|---|---|---|
| 0.025 in. | +1.00 V | −3.50 V |
| 0.050 in. | +2.00 V | −6.50 V |
| 0.075 in. | +3.50 V | −9.00 V |
| 0.100 in. | +5.50 V | −9.50 V |
| 0.125 in. | +7.50 V | −9.00 V |
| 0.150 in. | +11 (off scale) | −8.00 V |

Offset in +x direction, x-reading photodetectors 36 and 38

| Offset | Photodetector 36 | Photodetectors 38 |
|---|---|---|
| 0.025 in. | −0.75 V | +4.00 V |
| 0.050 in. | −1.75 V | +7.50 V |
| 0.075 in. | −3.50 V | +10.00 V |
| 0.100 in. | −5.50 V | +11 V (off scale) |
| 0.125 in. | −7.50 V | +10.00 V |
| 0.150 in. | −11 V (off scale) | +8.50 V |

Offset in +y direction, y-reading photodetectors 36 and 38

| Offset | Photodetector 36 | Photodetector 38 |
|---|---|---|
| 0.025 in. | −0.75 V | +4.00 V |
| 0.050 in. | −1.75 V | +7.00 V |
| 0.075 in. | −3.00 V | +9.00 V |
| 0.100 in. | −5.00 V | +10.00 V |
| 0.125 in. | −7.50 V | +10.00 V |
| 0.150 in. | −10.50 V | +9.00 V |

Offset in −y direction, y-reading photodetectors 36 and 38

| Offset | Photodetector 36 | Photodetector 38 |
|---|---|---|
| 0.025 in. | +0.75 V | −4.50 V |
| 0.050 in. | +2.00 V | −7.50 V |
| 0.075 in. | +3.50 V | −10.00 V |
| 0.100 in. | +5.50 V | −11 V (off scale) |
| 0.125 in. | +8.00 V | −10.00 V |
| 0.150 in. | +10.00 V | −9.00 V |

Terminal PHotodetector 38

Offset −x direction, x-reading photodetector 38

| Offset | Photodetector 38 |
|---|---|
| 0.025 in. | +2.00 V |
| 0.050 in. | +4.25 V |
| 0.075 in. | +6.00 V |
| 0.100 in. | +9.00 V |
| 0.125 in. | +11 V (off scale) |

Offset in +x direction, x-reading photodetector 38

| Offset | Photodetector 38 |
|---|---|
| 0.025 in | −2.50 V |
| 0.050 in. | −4.50 V |
| 0.075 in. | −7.00 V |
| 0.100 in. | −9.50 V |

Offset in +y direction, y-reading photodetector 38

| Offset | Photodetector 38 |
|---|---|
| 0.025 in. | −3.00 V |
| 0.050 in. | −5.75 V |
| 0.075 in. | −7.50 V |
| 0.100 in. | −10.00 V |

Offset in −y direction, y-reading photodetector 38

| Offset | Photodetector 38 |
|---|---|
| 0.025 in. | +2.25 V |
| 0.050 in. | +4.50 V |
| 0.075 in. | +6.50 V |
| 0.100 in. | +8.00 V |
| 0.125 in. | +10.00 V |

Next we verified the response of photodetectors 34, 36 and 38 with the quadrants of each photodetector rotated through angles of 30°, 45° and 60° in a counter-clockwise direction. Note that quadrants 40 and 52 are numbered in Cartesian fashion. After each photodetector was rotated, it was offset 0.141 inch for the 45° angle of rotation and 0.112 inch for the 30° and 60° angles of rotation. The data for the 45° readings are presented in TAble 4 and data for the 30° and 60° readings in Table 5.

TABLE 4

Photodetector response at 45°.

| Intermediate Photodetector 34 | Reading | Photodetector 34 | Photodetector 36 | Photodetector 38 |
|---|---|---|---|---|
| 45° Quad 1 | X | +7.5 V | −3.50 V | −1.50 V |
| | Y | +7.5 V | −3.50 V | −1.50 V |
| 45° Quad 2 | X | −6.0 V | +4.00 V | +1.75 V |
| | Y | +6.0 V | −4.00 V | −2.00 V |
| 45° Quad 3 | X | −7.0 V | +4.25 V | −1.50 V |
| | Y | −7.0 V | +4.25 V | −1.50 V |
| 45° Quad 4 | X | +8.0 V | −3.50 V | −1.50 V |
| | Y | −8.0 V | +3.50 V | +1.25 V |
| Intermediate Photodetector 36 | Reading | Photodetector 36 | | Photodetector 38 |
| Quad 1 | X | +7.00 V | −7.5 V | |
| | Y | 6.75 V | | −7.5 V |
| Quad 2 | X | −7.50 V | | +7.0 V |
| | Y | +7.50 V | | −7.5 V |
| Quad 3 | X | −8.00 V | | +7.5 V |
| | Y | −8.00 V | | +7.5 V |
| Quad 4 | X | +7.00 V | | −6.5 V |
| | Y | −7.00 V | | +6.5 V |
| Terminal Photodetector 38 | Reading | | | Photodetector 38 |

| Quad 1 | X | +8.50 V |
|---|---|---|
|  | Y | +7.00 V |
| Quad 2 | X | −7.50 V |
|  | Y | +7.50 V |
| Quad 3 | X | −8.25 V |
|  | Y | −9.00 V |
| Quad 4 | X | +8.00 V |
|  | Y | −9.50 V |

TABLE 5

Photodetector response at 30° and 60°.

| Photodetector 34 | Reading | Photodetector 34 | Photodetector 36 | Photodetector 38 |
|---|---|---|---|---|
| Quad 1 |  |  |  |  |
| 30° | X | +5.50 V | −4.00 V | −4.00 V |
|  | Y | +4.50 V | −2.50 V | −2.50 V |
| 60° | X | +4.50 V | −2.50 V | −2.25 V |
|  | Y | +6.00 V | −3.50 V | −3.75 V |
| Quad 2 |  |  |  |  |
| 30° | X | −3.25 V | +2.00 V | +2.25 V |
|  | Y | +5.00 V | −3.25 V | −4.00 V |
| 60° | X | −4.75 V | +3.50 V | +4.75 V |
|  | Y | +3.25 V | −2.00 V | −2.75 V |
| Quad 3 |  |  |  |  |
| 30° | X | −3.75 V | +4.50 V | +4.75 V |
|  | Y | −2.50 V | +3.00 V | +3.00 V |
| 60° | X | −2.00 V | +2.50 V | +2.00 V |
|  | Y | −3.00 V | +4.50 V | +4.00 V |
| Quad 4 |  |  |  |  |
| 30° | X | +3.50 V | −3.25 V | −3.00 V |
|  | Y | −4.25 V | +450 V | +4.00 V |
| 60° | X | +4.50 V | −4.25 V | −4.25 V |
|  | Y | −2.25 V | +2.50 V | +2.50 V |

| Photodetector 36 | Reading | Photodetector 36 | Photodetector 38 |
|---|---|---|---|
| Quad 1 |  |  |  |
| 30° | X | +5.50 V | −8.00 V |
|  | Y | +3.50 V | −4.25 V |
| 60° | X | +4.50 V | −5.75 V |
| Quad 2 30° | X | −3.50 V | −4.00 V |
|  | Y | +5.75 V | −8.25 V |
| 60° | X | −6.50 V | +9.00 V |
|  | Y | +4.75 V | −5.00 V |
| Quad 3 |  |  |  |
| 30° | X | −6.50 V | +9.25 V |
|  | Y | −3.50 V | +5.05 V |
| 60° | X | −4.50 V | +5.50 V |
|  | Y | −5.75 V | +10.00 V |
| Quad 4 |  |  |  |
| 30° | X | +2.50 V | −4.50 V |
|  | Y | 5.00 V | +8.25 V |
| 60° | X | +4.75 V | −9.25 V |
|  | Y | −3.00 V | +5.75 V |

| Terminal Photodetector 38 | Reading | Terminal Photodetector 38 |
|---|---|---|
| Quad 1 |  |  |
| 30° | X | +9.50 V |
|  | Y | +5.00 V |
| 60° | X | +4.50 V |
|  | Y | +8.25 V |
| Quad 2 |  |  |
| 30° | X | −9.00 V |
|  | Y | +5.50 V |
| 60° | X | −4.00 V |
|  | Y | +8.50 V |
| Quad 3 |  |  |
| 30° | X | −9.00 V |
|  | Y | −4.50 V |
| 60° | X | −5.00 V |
|  | Y | −9.50 V |
| Quad 4 |  |  |
| 30° | X | +5.00 V |
|  | Y | −9.50 V |
| 60° | X | +8.50 V |
|  | Y | −4.50 V |

Next, we determined the sensitivity of the system of FIG. 1 by moving photodetectors 34, 36 and 38 by very small increments in the X and Y directions. The data presented in Table 6 verify the limit of detectability of misalignment of the system. Photodetector 34 was moved first and the resultant outputs recorded. Then photodetector 34 was realigned perfectly and photodetector 36 was moved. After recording the resultant outputs of photodetectors 36 and 38, photodetector 36 was perfectly realigned and photodetector 38 was then moved.

TABLE 6

Sensitivity Data Check

| Intermediate Photodetector 34 |  | Offset in x direction. |  |
|---|---|---|---|
| Offset | Photodetector 34 | Photodetector 36 | Photodetector 38 |
| 0.005 in. | +.05 V | −.25 V | +.25 V |
| 0.010 in. | +.10 V | −.50 V | +.75 V |
| 0.015 in. | +.25 V | −.75 V | +1.00 V |

| Intermediate Photodetector 36 |  | Offset in x direction |
|---|---|---|
| Offset | Photodetector 36 | Photodetector 38 |
| 0.005 in. | −0.30 V | +1.00 V |
| 0.010 in. | −0.45 V | +2.00 V |
| 0.015 in. | −0.6 V | +2.75 V |

| Terminal Photodetector 38 |  | Offset in x direction. |
|---|---|---|
| Offset | Photodetector 38 |  |
| 0.005 in. | +1.00 V |  |
| 0.010 in. | +1.25 V |  |
| 0.015 in. | +1.75 V |  |

| Intermediate Photodetector 34 |  | Offset in y direction. |  |
|---|---|---|---|
| Offset | Photodetector 34 | Photodetector 36 | Photodetector 38 |
| 0.005 in. | +0.10 V | −0.3 V | +0.40 V |
| 0.010 in. | +0.25 V | −0.4 V | +0.70 V |
| 0.015 in. | +0.40 V | −0.7 V | +1.00 V |

| Intermediate Photodetector 36 |  | Offset in y direction. |
|---|---|---|
| Offset | Photodetector 36 | Photodetector 38 |
| 0.005 in. | −0.25 V | +0.75 V |
| 0.010 in. | −0.30 V | +1.50 V |
| 0.015 in. | −0.50 V | +2.40 V |

| Terminal Photodetector 38 |  | Offset in y direction. |
|---|---|---|
| Offset | Photodetector 38 |  |
| 0.005 in. | +0.3 V |  |
| 0.010 in. | +1.0 V |  |
| 0.015 in. | +1.3 V |  |

Assume that the system of FIG. 1 is operating with the X- and Y- indicators of the circuit of FIG. 5. With laser 28 on and photodetectors 34, 36 and 38 perfectly aligned all six X- and Y- indicators will show null indications, saying the system is perfectly aligned. Other conditions could exist that would produce the same result. One such condition would be power off to the photodetectors. However, this condition can be monitored by appropriate circuitry (not shown) even when the system is remotely located. Similarly, power off to laser 28 can be monitored. A worse condition is some unknown obstruction in the path of laser beam 32 preventing it from ultimately impinging on terminal photodetector 38. With the laser monitor indicating that laser 28 is on, this condition would not be known without the novel feature we incorporated into the system to tell when such condition exists. This features produces a negative Y voltage for terminal photodetector 38 whenever laser beam 32 is totally interrupted.

Each of quadrants 52 of terminal photodetector 38 has a characteristic dark current output in the range of approximately 1 $\mu$A with 8- to 10- volts bias on the diode. This dark current may be adjusted by adjusting the feedback resistor in the amplifier 68 connected to each individual quadrant 52. See, for example, the 10K, 1 percent feedback resistor in amplifier 68 of FIG. 4. With no light impinging on photodetector 38, we adjusted the feedback resistors in the amplifier 68 network of FIG. 5 to an unbalanced condition to the extent that a 0.5 volt reading was obtained on the Y- indicator in the negative Y direction only. When photodetector 38 was exposed to laser beam 32, the signal to noise ratio was about $10^4$ and hence this offset was masked in the signal. A null indication on the X- and Ye lower case for terminal photodetector 38 indicated that laser beam 32 was indeed centered on terminal photodetector 38. With beam 32 blocked the 0.5 volt negative Y offset was obtained.

In the system of FIG. 1, electronics assembly 76 contains the logic, steering, and other control circuits (not shown) required to distinguish between normal operation when laser beam 32 actually impinges on all four quadrants 52 of terminal photodetector 38 and the condition existing when laser beam 32 is obstructed, producing the negative Y output. The output of such circuits, when this condition exists, triggers an alarm, or, as illustrated in FIG. 1, supplies current along line 98 to light lamp 100 which is located on the operator's console. These circuits also inhibit the transmission of signals to servo drivers 84, 86 and 88.

FIG. 7 illustrates, in part, a modification of the system of FIG. 1 wherein beam splitter 102 divides beam 32 into two beams $32_1$ and $32_2$ having orthogonal axes $30_1$ and $30_2$. It will be understood that axis $30_1$ is parallel to original axis 30, but is not coincident therewith. Intermediate photodetector 104 and terminal photodetector 106 provide signals indicating the degree of misalignment, of alignment, or the equipment (not shown) on which they are mounted with respect to orthogonal axis $30_2$. It will be obvious that beam splitter 102 may be so disposed that axes $30_1$ and $30_2$ are not orthogonal. Moreover, beam splitter 102 may be located between intermediate photodetectors 34 and 36 or between intermediate photodetector 36 and terminal photodetector 38.

FIGS. 8 illustrates, in part, still a further modification to the system of FIG. 1 used to eliminate air turbulence in the line of sight between laser 28, intermediate photodetectors 34 and 36, and terminal photodetector 38. The modification utilizes pipe 108 to enclose the line of sight.

FIG. 9 illustrates schematically use of the invention in a collimating system. Here intermediate photodetector 110 mounts on laser 112. The apertures of photodetector 110 and laser 112 may coincide, as at 114, if preferred. Laser beam 116 having an axis 118 exits aperture 114 and impinges on mirror 120. If the planar incident surface of mirror 120 upon which laser beam 116 impinges is perpendicular to axis 118, laser beam 116 will be reflected back to impinge on equal areas of the four quadrant diodes of intermediate photodetector 110. In such event the outputs to electronics package 122 are equal and there will be no indications on the X and Y indicators. If the axis of the reflected beam does not coincide with axis 118, mirror 120 is not perpendicular to axis 118 and the X and Y indicators will so indicate. Adjustment of mirror 120 to zero the X and Y indicators will correct this condition. Obviously, servo systems can be utilized to maintain precise collimation automatically.

FIGS. 10 and 11 illustrate variations in the shapes of the areas of photosensitive materials in the photodetectors. Thus, in FIG. 10 intermediate photodetectors 34' or 36' have four photodiodes 40' shaped as illustrated and spaced equally at 90° intervals around aperture 48. Likewise, in FIG. 11 photodiodes 52' are spaced at 90° intervals around the center of terminal photodetector 38'. For simplicity, each photodetector should have at least four equal areas of photosensitive material spaced at 90° intervals around its center. Obviously, multiples of four areas may be used.

While FIG. 1 illustrates axis 30 of laser beam 32 as being directed parallel to line 24, it will be understood that axis 30 may be directed in a predetermined direction with respect to line 24. Equipments $20_1$, $20_2$, $20_3$ and $20_4$ may then be aligned in the predetermined direction with respect to line 24.

This invention may be embodied in other ways without departing from the spirit or essential character thereof. The embodiments of the invention described herein are therefore illustrative and not restrictive, the scope of the invention being indicated by the appended claims and all changes which come within the meaning and range of equivalency of the claims are intended to be embraced therein.

The invention claimed is:

1. A system for aligning a plurality of equipments in a predetermined direction with respect to a reference line of sight comprising:

a laser disposed with the axis of the laser beam directed in the predetermined direction;

a terminal photodetector having four equal areas of light-sensitive material spaced at 90° intervals around its center mounted on a first equipment, which is the most distant from the laser of the plurality of equipments to be aligned, so that the areas face the laser beam and when the terminal photodetector is centered on the axis of the laser beam the first equipment is aligned in the predetermined direction;

at least one intermediate photodetector mounted on an intermediate equipment located at a point between the laser and the first equipment, the photodetector having
a substrate with an aperture,
four equal areas of light-sensitive material on the substrate spaced at 90° intervals around the aperture and
an annulus of inactive material forming a central mask between the aperture and the light-sensitive areas,
the intermediate photodetector being so mounted that the areas and mask face the laser beam and when the intermediate photodetector is centered on the axis of the laser beam the intermediate equipment is aligned in the predetermined direction;

first electrical means connected to the areas of the terminal photodetector for producing signals indicative of the relative position of the terminal photodetector with respect to the axis of the laser beam when the laser beam impinges on the areas and for producing a distinguishable signal when the laser beam does not impinge upon the areas;

second electrical means connected to the areas of the intermediate photodetector for producing, when the laser beam impinges on its areas, signals indicative of its relative position with respect to the axis of the laser beam; and means for moving the terminal and intermediate equipments into alignment with the predetermined direction.

2. The system of claim 1 wherein the first electrical means produce null indications in the X and Y directions established by the four equal areas of light-sensitive material when the laser beam impinges on the photodetector and the photodetector is in alignment therewith and produce a predetermined signal in one of either the X or Y direction when the laser does not impinge upon the areas.

3. The system of claim 2 wherein the predetermined signal produced when the laser beam does not impinge upon the areas is obtained by adjustment of the dark current of one of the areas of light-sensitive material.

4. The system of claim 2 wherein the null indication and predetermined signal are obtained by the adjustment of the dark current of the four light-sensitive areas to an unbalanced condition whereby when the laser beam does not impinge upon the photodetector a signal is obtained in one direction only.

5. In a system for aligning equipment in a predetermined direction with reference to a line of sight established by a laser beam which includes a photodetector having four equal areas of light-sensitive material around its center mounted on equipment to be aligned, the improvement comprising electrical means connected to said areas of a photodetector for producing signals indicative of the relative position of the photodetector with respect to the axis of the laser beam when the laser beam impinges on the areas and for producing a distinguishable signal when the laser beam does not impinge upon the areas.

6. The improvement of claim 5 wherein the electrical means produce null indications in the X and Y directions established by the four equal areas of light-sensitive material when the laser beam impinges on the photodetector and the photodetector is in alignment therewith and produce a predetermined signal in one of either the X or Y direction when the laser beam does not impinge upon the areas.

7. The improvement of claim 6 wherein the predetermined signal produced when the laser beam does not impinge upon the areas is obtained by adjustment of the dark current of one of the areas of light-sensitive material.

8. The system of claim 6 wherein the null indication and predetermined signal are obtained by the adjustment of the dark current of the four light-sensitive areas to an unbalanced condition whereby when the laser beam does not impinge upon the photodetector a signal is obtained in one direction only.

* * * * *